(12) United States Patent
Swarts

(10) Patent No.: US 6,582,636 B1
(45) Date of Patent: *Jun. 24, 2003

(54) TWO-STEP PROCESS FOR PRODUCING SOLID SURFACE MATERIAL WITH FOAM BACKING

(75) Inventor: Donald Eugene Swarts, Grand Island, NY (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/412,792

(22) Filed: Mar. 29, 1995

(51) Int. Cl.[7] ............................ B29B 11/16; B29C 39/12
(52) U.S. Cl. ..................... 264/113; 264/112; 264/122; 264/250; 264/255
(58) Field of Search ................................ 264/46.4, 112, 264/113, 122, 241, 250, 255, 299, 308, DIG. 6, DIG. 57, 240; 523/318, 319

(56) References Cited

U.S. PATENT DOCUMENTS

| | | | | |
|---|---|---|---|---|
| 2,136,424 A | * | 11/1938 | Fields et al. | ................. 264/308 |
| 3,847,865 A | | 11/1974 | Duggins | ................. 260/42.52 |
| 4,085,246 A | | 4/1978 | Buser et al. | ................. 428/220 |
| 4,419,459 A | | 12/1983 | Melchior | ................. 521/59 |
| 4,446,177 A | * | 5/1984 | Munoz et al. | ................. 428/15 |
| 5,304,592 A | * | 4/1994 | Ghahary | |
| 5,476,895 A | * | 12/1995 | Ghahary | |

FOREIGN PATENT DOCUMENTS

| | | | |
|---|---|---|---|
| CA | 1310796 | 12/1992 | |
| DE | 31 24 490 A1 | 1/1983 | ............ C08J/3/24 |
| EP | 0 526 818 A2 | 2/1993 | ........... B29C/37/00 |
| GB | 1076167 | 7/1967 | |
| WO | WO 83/03223 | 9/1983 | |
| WO | WO 88/04322 | 6/1988 | |

OTHER PUBLICATIONS

Europäische Patentschrift, 0 285 046 B2, Erfinder: Schock, Karl.*
Patent Abstracts of Japan, vol. 10, No. 191 (M–495), Jul. 4, 1986 and JP,A,61 035915 (Asahi Chem. Ind. Co. Ltd.) Feb. 20, 1986.
Patent Abstracts of Japan, vol. 10, No. 90 (C–337), Apr. 8, 1986 and JP,A,60 223848 (Ina Seitou KK) Nov. 8, 1985.
Database WPI, Week 7734, Derwent Publications Ltd., London, GB AN 77–60215y, XP002010320 and JP,A,52 082 969 (Takamizu Kagaji Kog) Jul. 11, 1977.

* cited by examiner

Primary Examiner—Stephen J. Lechert, Jr.
Assistant Examiner—Kenneth M. Jone

(57) ABSTRACT

A process of producing solid surface material is provided with a thin layer of filled polymer integrally formed with a backing of bubble-filled polymer, without an interface or transition zone in the polymer mix, using two-step wet-on-wet casting.

4 Claims, No Drawings

TWO-STEP PROCESS FOR PRODUCING SOLID SURFACE MATERIAL WITH FOAM BACKING

BACKGROUND OF THE INVENTION

This invention relates to a process of producing a composite cast article having a polymeric solid surface with added filler and a backing of similar material also filled with hollow bubbles, with no transition zone of unfilled polymer between the layers.

Solid surface materials are known in the art including those based on polymethyl methacrylate and alumina trihydrate. Basic technology for these products is disclosed in U.S. Pat. No. 3,847,865—Duggins (1974), U.S. Pat. No. 4,085,246—Buser, Roedel and Vassiliou (1978), and published PCT patent application U.S. Ser. No. 88/04322—Frank, Otremba; Pohl and Schlier (1988).

Prior attempts to laminate such solid surface materials with bubble-filled backing material and fiberglass-reinforcement have led to expensive multi-step processes and to laminar products which had distinctly different layers with their own properties. Laminar products generally are more prone to delamination and other weaknesses due to the interface under certain conditions than integral products. Among the multi-layer, laminated products of this type is that of EP 285,046—Schock (1993).

All of the above-mentioned documents are incorporated herein by reference for their teachings of methods and materials for making solid surface filled polymeric materials. It would be desirable to be able to provide lighter weight sheet material with the surface characteristics of this solid surface material in integral form without laminar transitions between layers, and to be able to prepare such products by less expensive processes.

SUMMARY OF THE INVENTION

The present invention provides a process of producing the cast composite article comprising a polymer matrix and two zones of different filler, said article being substantially flat with two opposing faces, a first zone of such article including one face of the article having filler at a level in the range of 10 to 80% by weight of the filler plus matrix, and a second zone including the second face opposing said first face having filler of 5 to 60% and 3 to 30% of bubbles, both by weight of the filler and bubbles plus matrix, said first and second zones forming a continuum with essentially no layer of unfilled matrix between the two zones. Said process comprising the steps of forming a multi-layer composite article by casting on a flat surface a first mix comprising the polymerizable monomer(s) and a filler which will cure to give the composition of said first zone, and, before said first mix cures substantially, casting on the first mix a second mix comprising polymerizable monomer(s), filler, and bubbles which will cure to give the composition of said second zone, under conditions that will cause the second mix and the first mix to interpenetrate, so that there is essentially no interface in the matrix and no resulting layer of unfilled polymer, and curing the resulting composite article. In other embodiments, a third layer is added to the second layer, having a composition in the limits of the first layer. Also, a hard face can be added by applying it before the first layer with a filler harder than ATH, such as alumina, silica, calcium carbonate, or natural stone material such as granite. Furthermore, ground particles of filled or unfilled resin can be added to the first layer in accordance with the ground particles taught in U.S. Pat. No. 4,085,246.

DETAILED DESCRIPTION

An advantage of the invention is that it provides a light weight, more economical solid surface material without any transition zone of polymer which could create a zone of brittleness or cause other mechanical difficulties.

Parts, proportions and percentages herein are by weight except where indicated otherwise.

"Wet-on-Wet" Casting Procedure

Two mixtures are prepared so they can be cast sequentially, into a mold, one on top of the other. Mixture (A) consists of a filler, such as alumina trihydrate, dispersed in a liquid phase consisting of a syrup containing approximately 20% polymethylmethacrylate in methyl methacrylate monomer along with an initiator. Additional monomer may be added to adjust the mix viscosity. Colored pigments and/or particles may be added to get a desired color and pattern. A typical composition for mixture (A) comprises:

| | Wt % |
|---|---|
| Methyl methacrylate | 4.0 |
| Syrup | 36.0 |
| Alumina trihydrate | 42.0 |
| Colored particles (30–150 mesh U.S. Standard Sieve = 100–600 μm) | 18.0 |
| | 100.0 |

Mixture (B) consists of a filler, usually lightweight, such as hollow glass microspheres along with calcium acarbonate, dispersed in a liquid phase consisting of a syrup containing approximately 20% polymethylmethacrylate in methyl methacrylate monomer and an initiator. Additional monomer may be added to adjust casting viscosity. A typical composition for mixture (B) comprises:

| | Wt % |
|---|---|
| Methyl methacrylate | 44.0 |
| Syrup | 11.0 |
| Alumina trihydrate | 37.0 |
| "Scotchlite" K-1 glass bubbles (20–120 μm, median 70 μm, sp. gr. 0.125) | 8.0 |
| | 100.0 |

Mixture (A) is evacuated to remove air, then poured into a mold to form a 0.5 cm layer in the bottom of the mold. Mixture (B), also evacuated, is then poured on top of the layer from mixture (A) in the mold while it is still wet and uncured, to form a second layer which is 1.4 cm thick. After the structure has cured, the polymerized form of mixture (A) is the face layer and that of mixture (B) is the back foam layer. Although there appears to be two separate layers there is no interface between them. They are integral, with the polymer matrix continuous throughout the structure.

I claim:

1. A process of producing a cast composite article comprising a polymer matrix and two zones of different filler, said article being substantially flat with two opposing faces, a first zone of such article including one face of the article having filler at a level in the range of 10 to 80% by weight of the filler plus matrix, and a second zone including the second face opposing said first face having filler of 5 to 60% and 3 to 30% of bubbles, both by weight of the filler and bubbles plus matrix, said first and second zones forming a continuum with essentially no layer of unfilled matrix between the two zones, said process comprising the steps of forming a multi-layer composite article by casting on a flat surface or a base layer a first mix comprising polymerizable monomer and filler which will cure to give the composition of said first zone, and, before said first mix cures substantially, casting on the first mix a second mix comprising polymerizable monomer, filler, and bubbles which will cure to give the composition of said second zone, under conditions that will cause the second mix and the first mix to interpenetrate, so that there is essentially no interface in the matrix and no resulting layer of unfilled polymer, and curing the resulting composite article.

2. The process of claim 1 in which a third mix is cast on the second mix, said third mix being within the composition limits of said first mix under conditions that will cause the third mix and second mix to interpenetrate, so there is no interface in the matrix and no resulting layer of unfilled polymer, and curing the resulting three zone composite article.

3. The process of claim 1 further comprising a step of applying a base layer of polymerizable monomer with filler harder than alumina trihydrate to a flat surface prior to forming said multi-layer composite article of claim 1 on said base layer.

4. The process of claim 3 in which the harder filler is selected from the group consisting of alumina, silica, calcium carbonate and natural stone materials.

* * * * *